Dec. 7, 1965  R. W. LARSON  3,221,908
MATERIAL HANDLING DEVICE
Filed Feb. 25, 1964  4 Sheets-Sheet 1

INVENTOR.
BY *Robert W. Larson*
*Henry Powers*
ATTORNEY

Dec. 7, 1965 R. W. LARSON 3,221,908
MATERIAL HANDLING DEVICE
Filed Feb. 25, 1964 4 Sheets-Sheet 4

INVENTOR.
BY Robert W. Larson.
Henry Powers
ATTORNEY

United States Patent Office 3,221,908
Patented Dec. 7, 1965

3,221,908
MATERIAL HANDLING DEVICE
Robert W. Larson, Sanborn, Wis., assignor to Beloit Corporation, Beloit, Wis., a corporation of Wisconsin
Filed Feb. 25, 1964, Ser. No. 347,191
8 Claims. (Cl. 214—147)

This invention relates to work handling devices and more particularly to a mobile bunching and skidding machine for use in logging operations.

It is an object of this invention to provide an improved and novel material handling device.

It is another object of this invention to provide a material handling machine having a novel boom and grapple structure of increased maneuverability.

A further object of this invention is to provide a novel material handling machine for logging operations having correlated means for bunching and skidding a plurality of logs.

Other objects and advantages will become more apparent from the following description and drawings in which.

Figure 1:
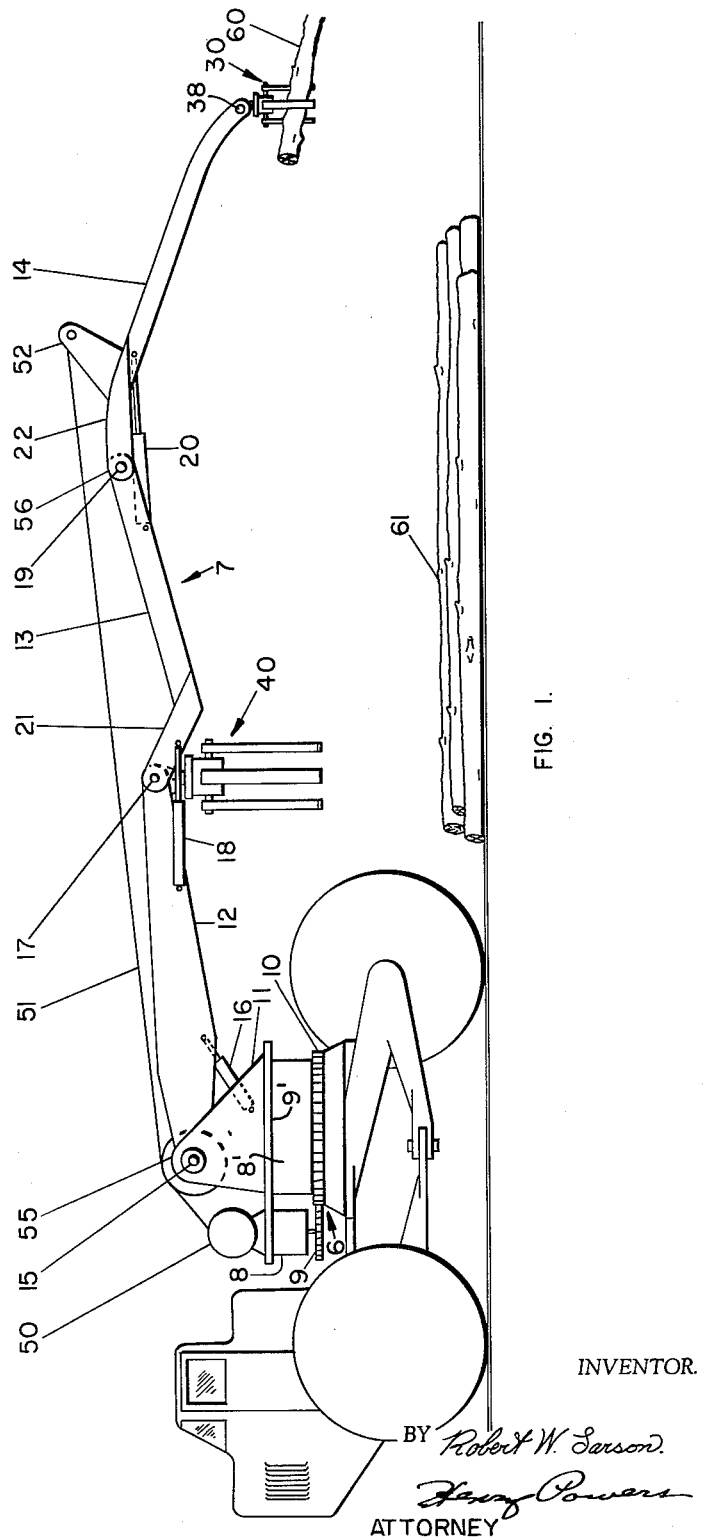
FIGURE 1 is an elevational view of one embodiment of this invention.

Referring to the drawings, the numeral 1 designates a mobile vehicle or carriage, which in the form shown comprises a two-wheel forward tractor portion 2 and a two-wheel rear trailer portion 3 connected together with a conventional draft and steering coupling 4. As will be understood the tractor portion 2 of the vehicle will include the usual conventional engine for propelling the vehicle and for providing power for operating the various powered operated devices thereon and described below.

Mounted on the frame 5 of the trailer portion 3 by means of a turntable assembly 6 is a boom assembly 7, with the turntable assembly comprising a base 8' which is rotatably driven about a vertical axis by means of a motor 8 and meshing gears 9 and 10 with the motor being of any conventional construction, as for example a hydraulic motor driven from the engine of the vehicle. The base 8' also includes a platform 9' which has fixed on it a boom supporting structure such as a pair of spaced uprights 11 to which the boom assembly is mounted.

In the specific embodiment shown, the boom assembly comprises a rear boom section 12, an intermediate section 13 and the end-most section 14. The rear boom section 12 is pivotally mounted at one end to the upright 11 about a pivot shaft 15 and is actuated for swinging movement in a vertical plane by means of a hydraulic cylinder-piston unit 16 pivotally connected between the uprights 11 and the rear section 12. Pivotally mounted to the distal end of the rear boom section 12 about a pivot pin 17 is the intermediate section 13 with the pivotal movement effected in a vertical plane by means of a hydraulic cylinder-piston unit 18 pivotally connected between the two sections. Carried on the free or distal end of the intermediate section 13 for a pivotal movement about a pin 19 is the end-most boom section 14 with the two sections having pivotally mounted there between a hydraulic cylinder-piston unit 20 for actuating the end-most section 14 in swinging movement in a vertical plane relative to the intermediate section 13. As will be noted the intermediate section 13 and the end-most section 14 are provided with, respectively, offset end portions 21 and 22 for facilitating the nesting of the sections during retraction of the boom assembly as can be more clearly seen in FIGURE 2.

Figure 4:
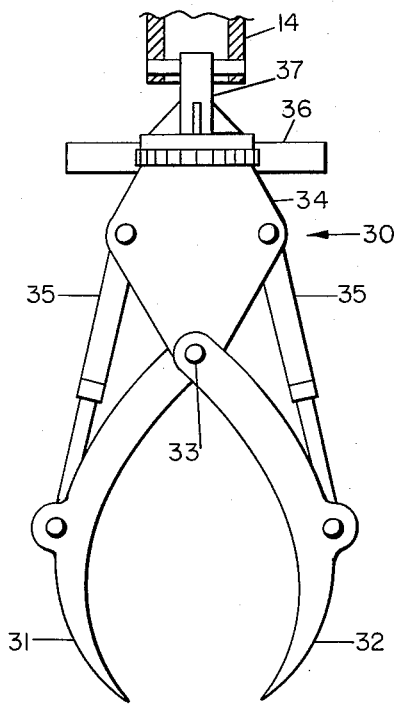
FIGURES 4 and 5 are, respectively, front and side views of a grapple structure adapted for use with this invention.
Figure 5:
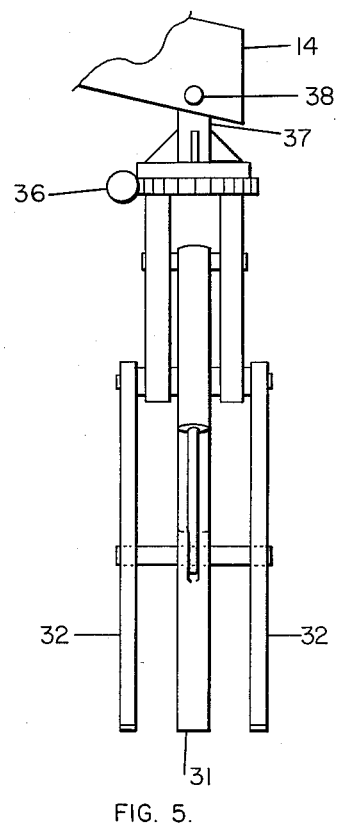

Carried at the distal end of the end-most section 14 is a pivotally mounted grapple 30 which is preferably controllably actuated for rotation about a vertical axis; as for example, as shown in FIGURES 4 and 5, comprises a pair of co-acting jaw units 31 and 32 pivotally mounted about a pin 33 to a supporting head 34. A pair of hydraulic cylinder-piston units 35 pivotally mounted between the jaw units and a supporting head, adapt the jaw units for movement toward and away from each other for releasably engaging elongated materials such as logs. The grapple 30 also includes a rack-pinion unit 36 for controllable rotation of the grapple about a vertical axis defined by the hanger rod 37 which in turn is pivotally mounted about stud pin 38 to the distal end of the end-most boom section 14. As will be appreciated the rack-pinion unit 36 can be actuated either mechanically or hydraulically by power generated from the engine of the vehicle 1. Thus, as will be observed while the pivotal mounting of the grapple on pins 38 permits it to swing freely in a vertical plane, the rack-pinion unit 36 permits controlled adjustment of the grapple about a vertical axis for purposes of aligning the work material handled thereby for purposes to be more fully discussed below.

Figure 3:
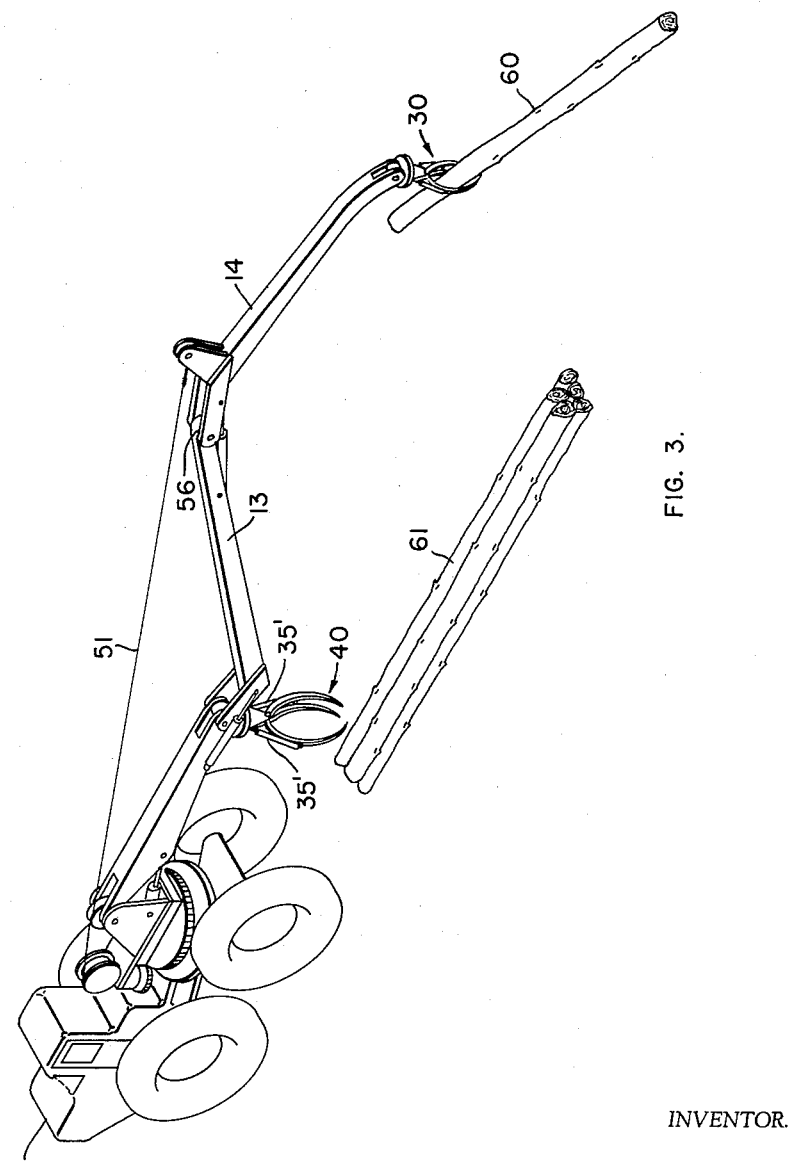
FIGURE 3 is a perspective view of the embodiment of the preceding figures.

The boom assembly 7 also includes a second grapple 40 pivotally mounted about a pin to the distal end of the rear boom section 12. This grapple 40 is similar in all respects to the previously described grapple 30 differing however, in its work handling capacity which for purposes of this invention must be at least twice that of the grapple 30. As with the grapple 30, the grapple 40 employs a pair of hydraulic cylinder-piston units, these units having been designated as 35' (FIGURE 3).

Supplementary action for facilitating the retraction of the boom assembly is provided by a winch 50 having extended between it and the end-most boom section 14 a flexible cable 51. The winch 50 is suitably secured to the platform 9' on which the uprights 11 are mounted and is powered for winding and unwinding thereon the flexible cable 51 which has its free end suitably secured to a projecting bracket 52 provided and extending from the end-most section 14 near the end portion thereof which is pivotally connected to the intermediate boom section 13. In the use of winch 50 the hydraulic cylinder-piston units 18 and 20 employed for articulating the various boom sections are preferably of the four-way valve type so as to enable the operator to set the cylinder-piston units into the floating position while retracting the boom assembly by means of winch 50. In order to assist the training of the flexible cable 51 during operation of the unit, this unit includes a guide roller 55 rotatably mounted about the pivot pin 15 of the uprighted standard 11, and a second guide roller may be rotatably mounted about the pivot pin 19 which pivotally connects the boom sections 13 and 14 but for the sake of drafting simplicity the end of the boom section has been merely shown with a smooth rounded end denoted by the numeral 56.

Figure 2:
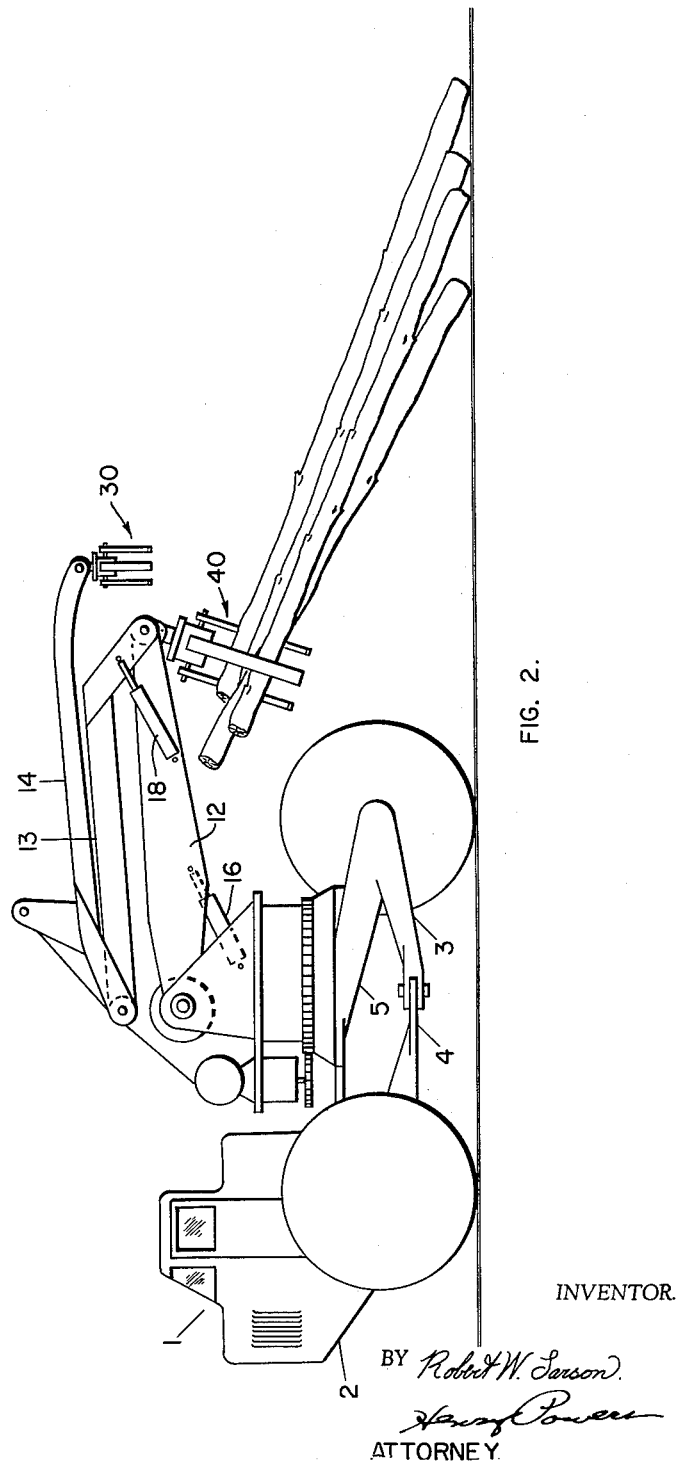
FIGURE 2 is an elevational view of the embodiment of the preceding figure illustrating a stage in the operation of this embodiment.

In operation, the operator will move the unit to a scattered cluster of felled elongated objects, such as telephone poles or logs obtained by the felling of trees from previous operations, as for example by the de-limbing and felling unit disclosed in co-pending U.S. application Serial No. 285,114 filed June 3, 1963. Initially the boom assembly will be carried in its nested position such as shown in FIGURE 2. Thereafter, the operator extends the boom assembly by actuating the hydraulic cylinder-piston units 18 and 20 to unfold and extend the boom sections 13 and 14 from their nested positions while playing out the flexible cable 51 from winch 50, until the boom assembly 7 is extended to the reach necessary to engage and clamp the most remote grapple 30 about a log 60. As will be appreciated the extension of the boom assembly 7 will be accompanied, if necessary, by appropriate lowering of the rear most boom section 12 by means of the hydraulic cylinder-piston unit 16, and by rotation of the boom assembly 7 through the agency of the turntable assembly 6 as required to select and reach the log 60. In addition the engagement of grapple 30 on log 60 may be also facilitated by appropriate rotation of the grapple 30 to assist the jaws of the grapple to engage the log.

After the log 60 is securely clamped by grapple 30, the operator may retract the hydraulic cylinder-piston units 18 and 20 to again retract and fold the boom sections 13 and 14, accompanied by any necessary raising and lowering of the rear boom section 12, by means of the cylinder-piston unit 16, and by rotation of the boom assembly 7 by means of the turntable assembly 6 to position and place the log 60 upon a stack of logs 61. As will be appreciated, the orientation of log 60 for placement on the stack 61 can be further facilitated by suitable rotation of grapple 30 about its vertical axis by means of the rack-pinion unit 36. Although obvious, it is noted that the general orientation of the stack of logs 61 is such that they will be in a suitable position for engagement by the skidder grapple 40 which is pivotally mounted to the distal end of the rearmost boom section 12.

In an alternate method of operation the retraction of the boom assembly 7 can be supplemented by actuation of the winch 50 to wind the flexible cable 51 which as shown in FIGURE 1 is trained upon guide roller 55. In a still further method, the operator may set the cylinder-piston units 18 and 20 into floating position and retract the boom sections 13 and 14 by means of winch 50 alone. In any event, the flexible cable 51 will at all times be maintained of the sufficient tension by appropriate actuation of winch 50 to prevent the cable from becoming loose and fouling. As will also be noted, upon retraction and folding of the boom sections 13 and 14 the remotest guide roller 56, at the knuckle of boom section 13 and 14 will engage the flexible cable 51 to assist in training the cable at its extension.

After the desired number of logs are piled in stack 61, the boom assembly is returned to its retracted and nested position (such as shown in FIGURE 2) and the skidder grapple 40 lowered, with the end-most boom section 12 by means of the cylinder-piston unit 16, over the butts of the trees in stack 61. Thereafter, the jaws of the grapple 40 are clamped over the butts of the trees and the stack elevated to traveling position by raising the end-most boom section 12 through actuation of the cylinder-piston unit 16. With the stack elevated to a traveling position, the operator can skid the stack of logs to another station for further processing where he can unload the stack 61 and return for another load.

Figure 6:
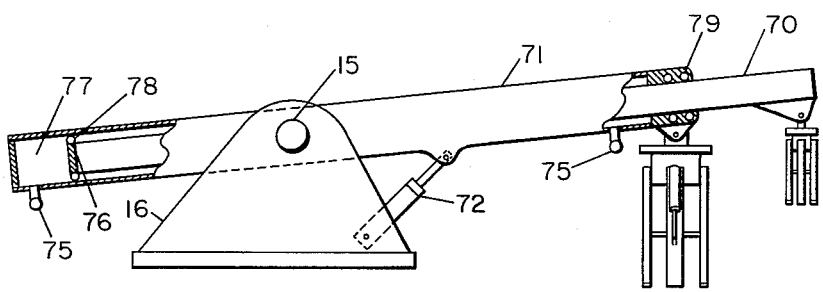
FIGURE 6 is a partial elevational view illustrating another embodiment of this invention.

FIGURE 6 illustrates another embodiment of this invention in which the extension of the boom assembly is accomplished by means of a telescoping front boom section assembly 70 which retracts within and extends from a fixed rear boom section 71, which in turn is raised and lowered by means of a hydraulic cylinder-piston unit 72, the unit 72 causing the section 71 to pivot about a pivot shaft 15' carried on a bracket 16'. Actuation of the telescoping front boom section 70 is accomplished by means of selective circulation of a hydraulic fluid through parts 75 into the appropriate compartment defined within the rear boom section 71 on either side of the piston 76 which is secured to the rear end of the front telescoping boom section 70. Sealing of the hydraulic fluid within compartment 77, of rear boom section 71, is effected by means of suitable packing and the like such as O-rings 78 provided on piston 76, and O-rings 79 provided on the distal end of the rear boom section 71 for frictional engagement about the telescoping end section 70.

Although the invention has been described with reference to specific embodiments and details, various modification and changes, within the scope of this invention, will be apparent to one skilled in the art and are contemplated to be embraced within the invention.

What is claimed is:
1. A device for handling elongated objects comprising
   (a) a mobile carriage;
   (b) boom support means;
   (c) an extensible boom including a
   (d) rear boom section pivotally mounted at one end to said support means for swinging movement in a vertical plane about a horizontal axis;
   (e) motor means operatively mounted on said device for actuating said rear boom section in its said swinging movement;
   (f) an extensible boom section having one end operatively mounted to the other end of said rear boom section and adapted for extensible retractive movement relative to the said distal end of said rear boom section;
   (g) a first grapple means pivotally mounted to the opposite distal end of said extensible boom section and including
   (h) a pair of co-acting jaws adapted for movement toward and away from each other;
   (i) motor means for actuating said jaws in their said movement;
   (j) a second larger grapple means having a work handling capacity at least twice that of said first grapple means and mounted to the said opposite distal end of said rear boom section and including
   (k) a pair of co-acting jaws adapted for movement toward and away from each other;
   (l) motor means for controlled actuation of the said jaws of said second grapple means in their said movement, with said first and second grapple means being adapted for alignment of the openings between their respective jaws longitudinally of said extensible boom, and a
   (m) motor means operatively connected between said rear boom section and said extensible boom section for reversibly extending said extensible boom section and concurrently moving the first grapple mounted thereon relative to said second grapple whereby said first grapple is adapted to an elongated object thereon for engagement by second grapple.

2. The device of claim 1 including
   (a) a turntable interposed between said carriage and said boom support means for rotation about a vertical axis;
   (b) and motor means for adjustably rotating said boom support means relative to said carriage.

3. The device of claim 1 wherein said extensible section comprises
   (a) an intermediate boom section and
   (b) an end boom section, said intermediate section having one end pivotally mounted to the distal end of said rear boom section for swinging movement about a horizontal axis forwardly and rearwardly of said rear boom section with said rearward movement folding said intermediate section above and on said rear section;
   (c) said motor means which is connected between said rear boom section and said extensible boom section actuating said intermediate section in its said pivotal movement relative said rear boom section; and with said end section having one end pivotally mounted to the other distal end of said intermediate section for swinging forward and rearward movement about a horizontal axis in extension and retraction relative to said intermediate section with said end section being adapted to fall on retraction against and on said intermediate section;

(d) and motor means for actuating said end section in its said pivotal movement relative to said intermediate section.

4. The device of claim 3 and including
(a) a turntable interposed between said carriage and said boom support means and mounting said boom support means for rotation about a vertical axis;
(b) and motor means for adjustably rotating said boom support means relative to said carriage.

5. The device of claim 3 and including
(a) a winch mounted on said boom support means;
(b) flexible cable means having one end secured to said winch for winding on and unwinding therefrom with the other end of said cable secured to the said one end of said end section, the actuating of said winch for winding and unwinding said cable thereby swinging the said intermediate and end sections relative to each other and to said rear boom section to facilitate the retraction of said boom means.

6. The device of claim 5 including
(a) a turntable interposed between said carriage and said boom support means and mounting said boom support means for rotation about a vertical axis;
(b) and motor means for adjustably rotating said boom support means relative to said carriage.

7. A device for handling elongated objects comprising
(a) a mobile carriage;
(b) boom support means mounted on said carriage;
(c) an extensible and retractible boom means having
(d) three sections pivotally connected together about horizontal axes in endwise relationship to each other, one of said sections forming a rear section and having one end thereof pivotally mounted to said support means for swinging movement about a horizontal axis;
(e) a first grapple mounted on the distal end of the end most of said sections;
(f) a second larger grapple mounted on and adjacent the other end of said rear section and having a work handling capacity at least twice that of said first grapple, with said first grapple being adapted for aligning elongated objects carried thereby for engagement of said second grapple;
g) a first motor means operatively connected to said rear section for controllably swinging said rear section relative to said support means;
(h) a second motor means operatively connected between said rear section and the adjacent section for controllably swinging said adjacent section for movement forwardly, rearwardly and above said rear section with the rearward limit of said movement folding said adjacent section over and on said rear section;
(i) and a third means operatively connected between said endmost section and the adjacent section for controllably swinging said endmost section for forward and rearward movement on the adjacent section with said endmost section being adapted to fold on and above said adjacent section when the adjacent section is folded back on and above said rear section.

8. A device of claim 7 including
(a) a turntable interposed between said carriage and said boom support means and mounting said boom support means for rotation about a vertical axis;
(b) and a fourth motor means for adjustably rotating said boom support means relative to said carriage.

References Cited by the Examiner
UNITED STATES PATENTS

| 2,831,589 | 4/1958 | Way. |
| 2,903,294 | 9/1959 | Shook. |
| 3,035,722 | 5/1962 | Anderson et al. |
| 3,165,215 | 1/1965 | Larson. |

HUGO O. SCHULZ, *Primary Examiner.*